A. R. PARK.
Seed-Dropper.
No 29,907
Patented Sept. 4, 1860.
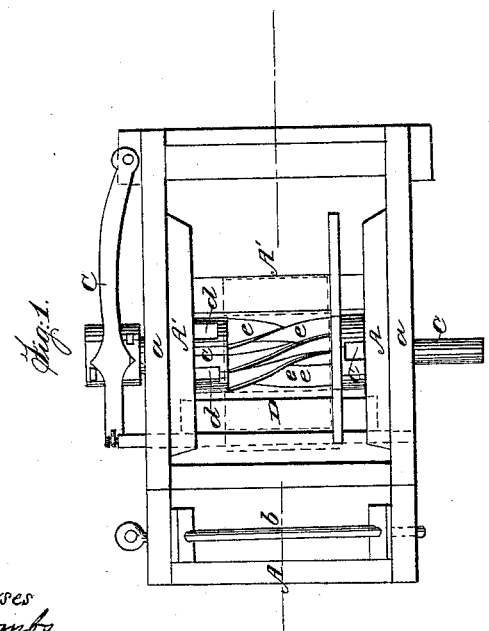

UNITED STATES PATENT OFFICE.

A. R. PARK, OF COLUMBIA, TEXAS.

IMPROVEMENT IN SEEDING-MACHINES.

Specification forming part of Letters Patent No. 29,907, dated September 4, 1860.

*To all whom it may concern:*

Be it known that I, A. R. PARK, of Columbia, in the county of Brazoria and State of Texas, have invented a new and Improved Seed-Planter; and I do hereby declare that the following is a full, clear, and exact description thereof, reference being had to the accompanying drawings, making part of this specification, in which—

Figure 1 is a top view of the seed-hopper and seed-distributing devices. Fig. 2 is a longitudinal middle section taken vertically through Fig. 1.

Similar letters of reference indicate corresponding parts in both figures.

This invention relates to a machine for sowing seed broadcast, in drills, or in hills, and for sowing cotton, corn, and all other kinds of seed.

It consists in arranging in the bottom of a seed-hopper which is furnished with a reciprocating yielding slide or agitator for the seed in the hopper a shaft having cylindrical heads on each end, that are provided with seed-cells, which heads are connected together by strips of metal running spirally around the shaft, that form long channels which conduct seed from the hopper and deposit it into the ground, as will be hereinafter described and represented.

To enable those skilled in the art to fully understand my invention, I will proceed to describe its construction and operation.

A is a frame supporting the seed-distributing devices, to one end of which is jointed the seed-hopper A' by suitable arms, *a a*, which confine the movable parts in place.

*b* is a pin that locks the hopper down on the frame A. This frame and hopper are mounted on suitable wheels, and furnished with plows (not shown) for opening the ground and preparing it for the reception of the seed. The back of the seed-hopper is inclined, and in the bottom is placed a shaft, C, extending transversely across the machine, which shaft is to be rotated by a belt passing around the hub of one of the driving-wheels, or in any other suitable way. This shaft has two cylindrical drums, *c c*, on it, placed at each end, inside of the hopper, which drums have seed-cups *d d* in them for dropping seed from the hopper either in drills or in hills. Between these drums *c c*, and extending from one to the other, are spiral strips *e e*, of a suitable width to form deep channels for distributing cotton-seed or other varieties of seed broadcast. In front of this distributing-cylinder is an apron, D, which is held up by a spring, E, and which is made to slide laterally, or in a direction with its length, by a vibrating lever, G, which is operated by a drum on the distributer-shaft C. This apron D will yield sufficiently to allow sticks, stones, &c., that are mixed with the seed to escape freely without injury to the machine. Besides, the rapid motion given to it will assist in agitating the seed in the box. The spring E will insure the return of the apron to its place after being depressed by the passage of foreign substances.

Now, in planting corn with this machine the channels between the drums *c c* should be covered with a screen, as shown in red lines, Fig. 2, leaving the seed-cups in the drums open to receive and discharge the grains of corn as the shaft C is rotated. The machine will now plant in two rows at one time. Then by covering one of the drums *c* up the corn will be planted in one row only; or, again, by placing a partition in the hopper, separating one of the drums from the long channels, both cotton-seed and corn may be planted at the same time. The quantity planted is easily regulated by covering more or less of the planting-wheel with the screens.

Having thus described my invention, what I claim as new, and desire to secure by Letters Patent, is—

A rotary seed-distributer composed of drums *c c* and longitudinal spiral strips *e e* for distributing different kinds of seed, in combination with the reciprocating yielding apron D and a seed-hopper, substantially as and for the purposes herein set forth.

A. R. PARK.

Witnesses:
W. F. SWAIN,
THOMAS BROOKS.